United States Patent
Tanaka et al.

(10) Patent No.: US 12,192,630 B2
(45) Date of Patent: *Jan. 7, 2025

(54) PROCESSOR OF IMAGING APPARATUS, IMAGING APPARATUS, CONTROL METHOD OF IMAGING APPARATUS, AND CONTROL PROGRAM OF IMAGING APPARATUS

(71) Applicant: FUJIFILM Corporation, Tokyo (JP)

(72) Inventors: Koichi Tanaka, Saitama (JP); Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,593

(22) Filed: Feb. 6, 2024

(65) Prior Publication Data

US 2024/0179411 A1    May 30, 2024

Related U.S. Application Data

(63) Continuation of application No. 17/932,658, filed on Sep. 15, 2022, now Pat. No. 11,936,984, which is a
(Continued)

(30) Foreign Application Priority Data

Apr. 28, 2020   (JP) .................................. 2020-079514

(51) Int. Cl.
*H04N 23/68*   (2023.01)
*H04N 23/62*   (2023.01)
(Continued)

(52) U.S. Cl.
CPC ........... *H04N 23/687* (2023.01); *H04N 23/62* (2023.01); *H04N 23/635* (2023.01); *H04N 23/80* (2023.01)

(58) Field of Classification Search
CPC .... H04N 23/687; H04N 23/62; H04N 23/635; H04N 23/80; H04N 23/632; H04N 23/663; H04N 23/6842; G03B 5/00
See application file for complete search history.

(56) References Cited

U.S. PATENT DOCUMENTS

| 11,936,984 B2 * | 3/2024 | Tanaka ................. H04N 23/663 |
| 2007/0097219 A1 | 5/2007 | Nomura et al. |

(Continued)

FOREIGN PATENT DOCUMENTS

| CN | 107003586 A | 8/2017 |
| JP | H04-319923 A | 11/1992 |

(Continued)

OTHER PUBLICATIONS

International Search Report issued in PCT/JP2021/008082; mailed Jun. 8, 2021.
(Continued)

*Primary Examiner* — Christopher K Peterson
(74) *Attorney, Agent, or Firm* — Studebaker & Brackett PC

(57) ABSTRACT

A processor of an imaging apparatus including an imaging element that images a subject through an imaging optical system is configured to: perform a recording control of performing one of: first processing as defined herein; and second processing as defined herein; perform an image shake correction control of correcting an image shake of a captured image output from the imaging element by moving one or both of the imaging element and a lens included in the imaging optical system; perform image processing of generating a live view image for displaying a subject image formed in the second region on a display unit; and perform a control of setting, in a case of performing the first processing, a movable range of at least one of the imaging element and the lens in the image shake correction control
(Continued)

to be larger than in a case of performing the second processing.

6 Claims, 15 Drawing Sheets

Related U.S. Application Data continuation of application No. PCT/JP2021/008082, filed on Mar. 3, 2021.

(51) Int. Cl.
*H04N 23/63* (2023.01)
*H04N 23/80* (2023.01)

(56) References Cited

U.S. PATENT DOCUMENTS

2016/0274347 A1   9/2016   Okabe
2017/0244900 A1   8/2017   Ito

FOREIGN PATENT DOCUMENTS

| JP | 2007-114311 A | 5/2007 |
| JP | 2010-187266 A | 8/2010 |
| JP | 2010-273054 A | 12/2010 |
| JP | 2014-135567 A | 7/2014 |
| JP | 2014206662 A | 10/2014 |
| JP | 2016050973 A | 4/2016 |
| JP | 2016080918 A | 5/2016 |
| JP | 2020-008739 A | 1/2020 |

OTHER PUBLICATIONS

Written Opinion of the International Searching Authority issued in PCT/JP2021/008082; mailed Jun. 8, 2021.
An Office Action mailed by The State Intellectual Property Office of People's Republic of China on May 9, 2024, which corresponds to Chinese U.S. Appl. No. 18/433,593.7 and is related to U.S. Appl. No. 18/433,593; with English translation.
An Office Action; "Notice of Reasons for Refusal," mailed by the Japanese Patent Office on Oct. 1, 2024, which corresponds to Japanese Patent Application No. 2023-165958 and is related to U.S. Appl. No. 18/433,593; with English language translation.

* cited by examiner

PROCESSOR OF IMAGING APPARATUS, IMAGING APPARATUS, CONTROL METHOD OF IMAGING APPARATUS, AND CONTROL PROGRAM OF IMAGING APPARATUS

CROSS REFERENCE TO RELATED APPLICATION

This application is a continuation of U.S. application Ser. No. 17/932,658 filed on Sep. 15, 2022, which is a continuation of International Application No. PCT/JP2021/008082 filed on Mar. 3, 2021, and claims priority from Japanese Patent Application No. 2020-079514 filed on Apr. 28, 2020, the entire disclosures of which are incorporated herein by reference.

BACKGROUND OF THE INVENTION

1. Field of the Invention

The present invention relates to a processor of an imaging apparatus, an imaging apparatus, a control method of an imaging apparatus, and a computer readable medium storing a control program of an imaging apparatus.

2. Description of the Related Art

JP2007-114311A discloses an apparatus comprising an imaging optical system including an imaging sensor, an electronic zooming unit that changes a subject region by trimming a part of an image formed on the imaging sensor, an image shake correction unit that operates a shake correction optical element constituting a part of the imaging optical system in a plane orthogonal to an optical axis in accordance with a magnitude and a direction of a shake exerted on the imaging optical system, a section in which area data indicating a change in size of an effective imaging region corresponding to the subject region in a case where the subject region is changed by the electronic zooming unit is recorded in advance, and a movable range control unit that changes a movable range of the shake correction optical element corresponding to the change of the subject region based on the area data of the recording section.

JP1992-319923A (JP-H4-319923A) discloses a camera comprising a setting unit that sets any mode of a normal imaging mode in which the entire imaging screen is printed or a trimming imaging mode in which a pseudo zoomed-in photo is obtained by trimming a part of the imaging screen. In a case where the trimming imaging mode is set, the camera operates a shake detection unit that detects a shake of an image in the imaging screen.

SUMMARY OF THE INVENTION

An object of the present invention is to provide a processor of an imaging apparatus, an imaging apparatus, a control method of an imaging apparatus, and a computer readable medium storing a control program of an imaging apparatus that improve image shake correction performance.

A processor of an imaging apparatus according to an aspect of the present invention is a processor of an imaging apparatus including an imaging element that images a subject through an imaging optical system, the processor being configured to perform a recording control of performing any of first processing of recording a first captured image output from a first region of a light-receiving region of the imaging element and second processing of recording a second captured image output from a second region, which is larger than the first region, of the light-receiving region, perform an image shake correction control of correcting an image shake of a captured image output from the imaging element by moving one or both of the imaging element and a lens included in the imaging optical system, perform image processing of generating a live view image for displaying a subject image formed in the second region on a display unit, and perform a control of setting, in a case of performing the first processing, a movable range of at least one of the imaging element or the lens in the image shake correction control to be larger than in a case of performing the second processing.

An imaging apparatus according to another aspect of the present invention comprises the processor, and the imaging element.

A control method of an imaging apparatus according to still another aspect of the present invention is a control method of an imaging apparatus including an imaging element that images a subject through an imaging optical system, the method comprising performing a recording control of performing any of first processing of recording a first captured image output from a first region of a light-receiving region of the imaging element and second processing of recording a second captured image output from a second region, which is larger than the first region, of the light-receiving region, performing an image shake correction control of correcting an image shake of a captured image output from the imaging element by moving one or both of the imaging element and a lens included in the imaging optical system, performing image processing of generating a live view image for displaying a subject image formed in the second region on a display unit, and performing a control of setting, in a case of performing the first processing, a movable range of at least one of the imaging element or the lens in the image shake correction control to be larger than in a case of performing the second processing.

A control program included in a computer readable medium according to still another aspect of the present invention is a control program of an imaging apparatus including an imaging element that images a subject through an imaging optical system, the control program causing a processor to execute a recording control of performing any of first processing of recording a first captured image output from a first region of a light-receiving region of the imaging element and second processing of recording a second captured image output from a second region, which is larger than the first region, of the light-receiving region, an image shake correction control of correcting an image shake of a captured image output from the imaging element by moving one or both of the imaging element and a lens included in the imaging optical system, image processing of generating a live view image for displaying a captured image output from the second region on a display unit, and a control of setting, in a case of performing the first processing, a movable range of at least one of the imaging element or the lens in the image shake correction control to be larger than in a case of performing the second processing.

According to the present invention, image shake correction performance can be improved.

DESCRIPTION OF THE PREFERRED EMBODIMENTS

Figure 1:
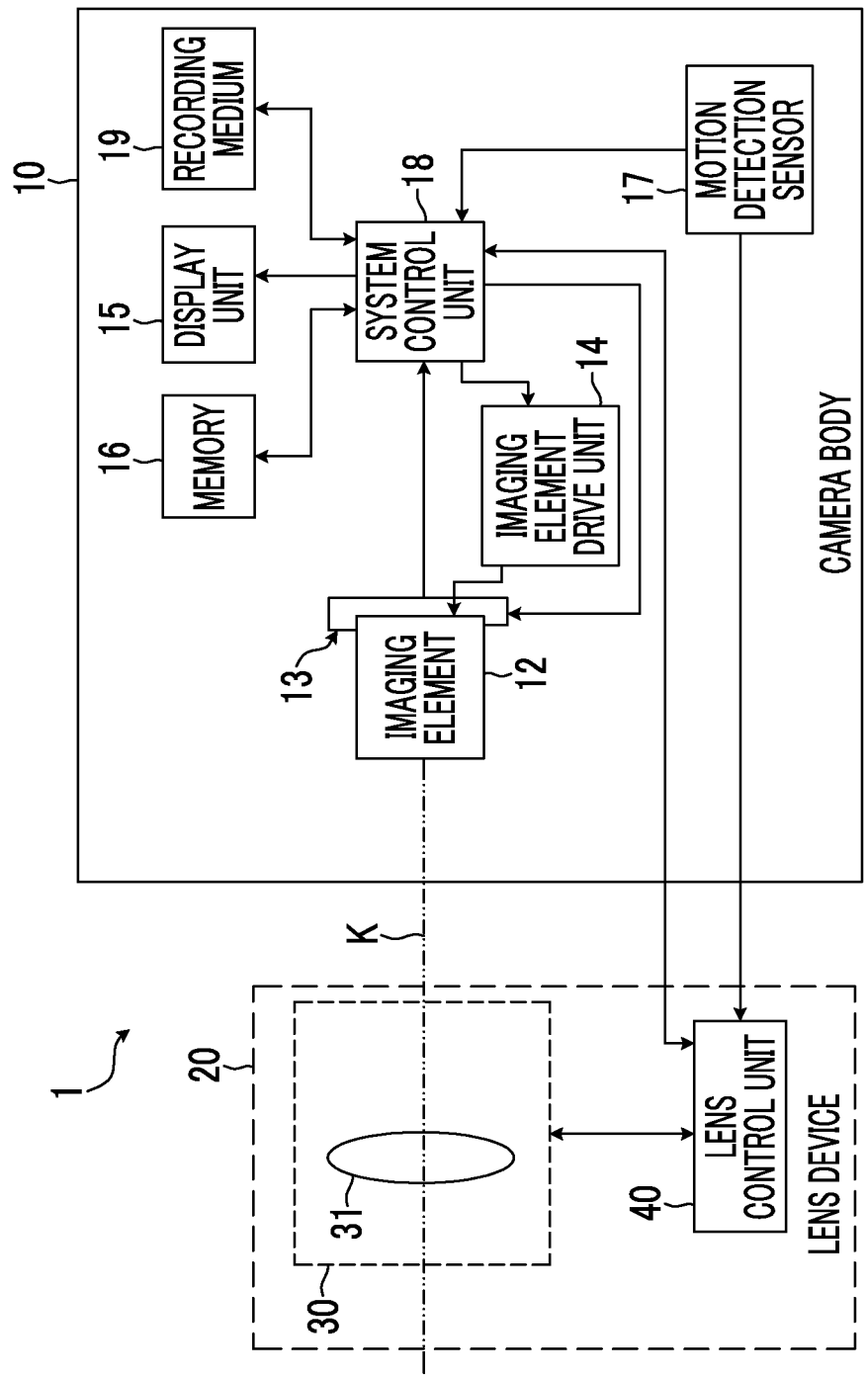
FIG. 1 is a diagram illustrating a schematic configuration of a digital camera 1 that is one embodiment of an imaging apparatus according to the present invention.

FIG. 1 is a diagram illustrating a schematic configuration of a digital camera 1 that is one embodiment of an imaging apparatus according to the present invention.

The digital camera 1 comprises a camera body 10 and a lens device 20. The lens device 20 is attachably and detachably, in other words, interchangeably, configured with respect to the camera body 10. The lens device 20 may be integrated with the camera body 10.

The lens device 20 includes an imaging optical system 30 and a lens control unit 40. The imaging optical system 30 comprises an imaging lens 31 and a stop mechanism and the like, not illustrated. For example, the imaging lens 31 is composed of a single lens or a plurality of lenses including a lens for adjusting a focal point of the imaging optical system 30. The lens control unit 40 is mainly configured with a processor and controls driving of the imaging optical system 30 under control of a system control unit 18, described later.

The camera body 10 comprises an imaging element 12, an imaging element shift mechanism 13, an imaging element drive unit 14, a display unit 15 that is a display device such as a liquid crystal display or an organic electro luminescence (EL) display, a memory 16 including a random access memory (RAM) as a volatile memory in which information is temporarily recorded, a read only memory (ROM) as a non-volatile memory in which a program and various information necessary for an operation of the program are recorded in advance, and the like, a motion detection sensor 17, the system control unit 18, and a recording medium 19 such as a memory card configured with a non-volatile memory.

The imaging element 12 images a subject through the imaging optical system 30. The imaging element 12 is configured with a charge coupled device (CCD) image sensor, a complementary metal oxide semiconductor (CMOS) image sensor, or the like. The imaging element 12 includes a light-receiving region in which a plurality of pixels are two-dimensionally arranged. In a case where the imaging element 12 is a CMOS image sensor, the imaging element drive unit 14 may be integrated with the CMOS image sensor.

Figure 2:
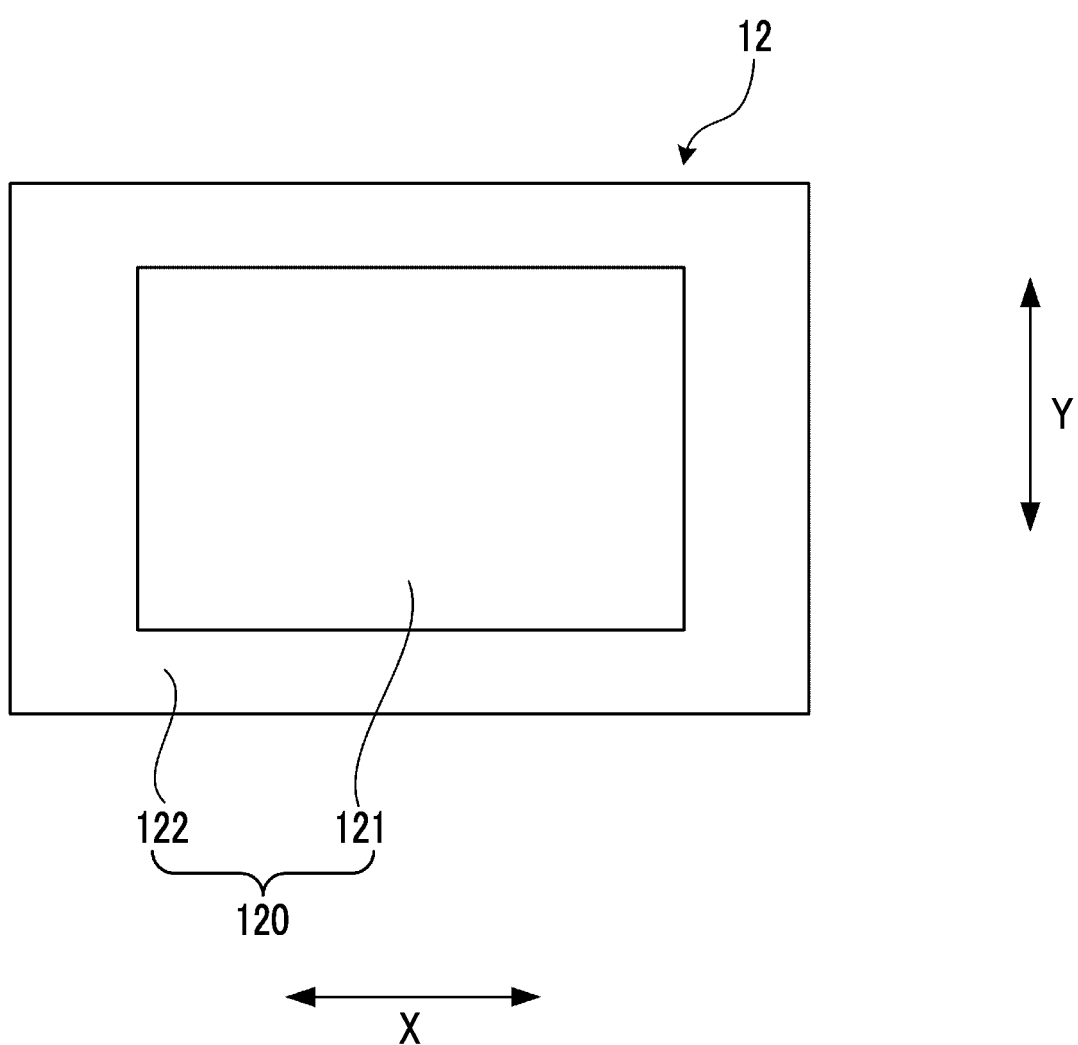
FIG. 2 is a schematic plan view of a light-receiving region of an imaging element 12 seen in a direction of an optical axis K.

FIG. 2 is a schematic plan view of the light-receiving region of the imaging element 12 seen in a direction of an optical axis K. In a rectangular light-receiving region 120 of the imaging element 12, the plurality of pixels are two-dimensionally arranged in a row direction X and a column direction Y orthogonal to the row direction X. In the light-receiving region 120, a rectangular crop region 121 that is a region of a part of the light-receiving region 120 and an edge part region 122 that is a region excluding the crop region 121 are set. The crop region 121 constitutes a first region. The light-receiving region 120 constitutes a second region. The edge part region 122 constitutes a third region. A set of pixel signals output from all pixels of the light-receiving region 120 or a part (for example, pixels of only odd-numbered rows) of all pixels will be referred to as a captured image signal. A crop ratio $\beta$ is defined as a value obtained by dividing a size (defined as a length of a diagonal line) of the light-receiving region 120 by a size (defined as a length of a diagonal line) of the crop region 121.

The imaging element shift mechanism 13 is a mechanism for preventing a shake of a subject image formed in the light-receiving region 120 of the imaging element 12 by moving the imaging element 12 in a plane perpendicular to the optical axis K of the imaging optical system 30.

The motion detection sensor 17 is a sensor for detecting a motion of the digital camera 1. The motion detection sensor 17 is configured with, for example, an acceleration sensor or an angular velocity sensor or both thereof. The motion detection sensor 17 may be disposed in the lens device 20.

The system control unit 18 manages and controls the entire digital camera 1. A hardware structure of the system control unit 18 corresponds to various processors that perform processing by executing programs including a control program of the imaging apparatus.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit or the like that is a processor having a circuit configuration dedicatedly designed to execute a specific type of processing like an application specific integrated circuit (ASIC). More specifically, a structure of the various processors is an electric circuit in which circuit elements such as semiconductor elements are combined.

The system control unit 18 may be configured with one of the various processors or may be configured with a combination of two or more processors of the same type or different types (for example, a combination of a plurality of FPGAs or a combination of a CPU and an FPGA).

The system control unit 18 causes the imaging element 12 to image the subject by controlling the imaging element drive unit 14 and outputs a captured image signal corresponding to the subject image formed in the light-receiving region 120 of the imaging element 12 from the imaging element 12. The system control unit 18 generates an image of a format such as Joint Photographic Experts Group (JPEG) format reproducible by the digital camera 1 or another apparatus by performing image processing on the captured image signal (RAW data) output from the light-receiving region 120 of the imaging element 12.

Hereinafter, the image obtained by performing image processing on the captured image signal output from the light-receiving region 120 of the imaging element 12 will be referred to as a captured image output from the light-receiving region 120 of the imaging element 12. The captured image includes a live view image that is an image for displaying the subject image formed in the light-receiving region 120 on the display unit 15, and a normal recording image that is an image for recording the subject image formed in the light-receiving region 120 on the recording medium 19. The normal recording image constitutes a second captured image. While the subject included in each of the live view image and the normal recording image is the same, sizes (the number of vertical and horizontal pixels) of the images are different. An image obtained by performing image processing on a captured image output from the crop region 121 in the captured image signal output from the light-receiving region 120 will be referred to as a crop recording image. The crop recording image constitutes a first captured image.

An imaging mode of the digital camera 1 includes a normal recording mode in which second processing of imaging the subject by the imaging element 12 at a timing corresponding to an imaging instruction and recording the normal recording image (captured image output from the light-receiving region 120) obtained by the imaging on the recording medium 19 is performed, and a crop recording mode in which first processing of imaging the subject by the imaging element 12 at the timing corresponding to the imaging instruction and recording the crop recording image (captured image output from the crop region 121) obtained by the imaging on the recording medium 19 is performed. Each of the normal recording image and the crop recording image may be set to be recorded on the recording medium 19 in the form of RAW data before image processing.

In both of the normal recording mode and the crop recording mode, the system control unit 18 performs a control of imaging the subject by the imaging element 12, generating the live view image by performing image processing on the captured image signal output from the light-receiving region 120 of the imaging element 12 by the imaging, and displaying the live view image on the display unit 15.

Image processing performed on the captured image signal in generating the live view image includes correction processing for correcting a decrease in image quality that may occur depending on optical characteristics of the imaging optical system 30, a pixel structure of the imaging element 12, or the like. The correction processing includes brightness shading correction of correcting a decrease in brightness depending on an image height, noise correction of reducing a noise increased by the brightness shading correction, outline highlight processing of correcting a decrease in sharpness (blurriness) depending on the image height, distortion correction of correcting a distortion occurring in an edge part of the image, lateral chromatic aberration correction of correcting a chromatic aberration in the edge part, fringe correction, and the like. Image processing in generating each of the normal recording image and the crop recording image also includes the same correction processing.

Figure 3:
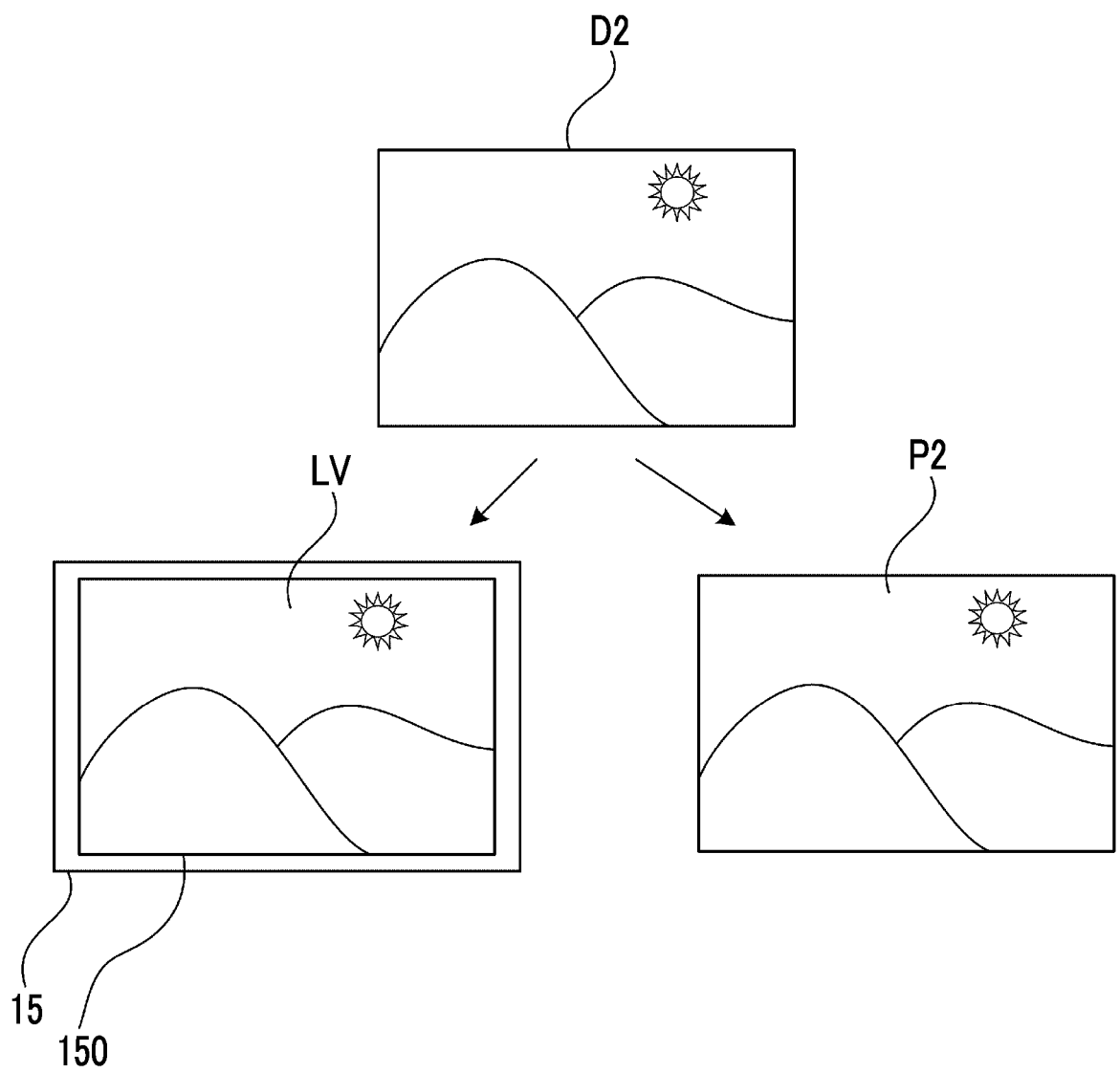
FIG. 3 is a diagram schematically illustrating a live view image and a normal recording image in a normal recording mode.

FIG. 3 is a diagram schematically illustrating the live view image and the normal recording image in the normal recording mode. In the normal recording mode, a live view image LV is generated from a captured image signal D2 output from the light-receiving region 120 of the imaging element 12 and is displayed on a display surface 150 of the display unit 15. In a case where the imaging instruction is provided in the normal recording mode, a normal recording image P2 is generated from the captured image signal D2 and is recorded on the recording medium 19.

Figure 4:
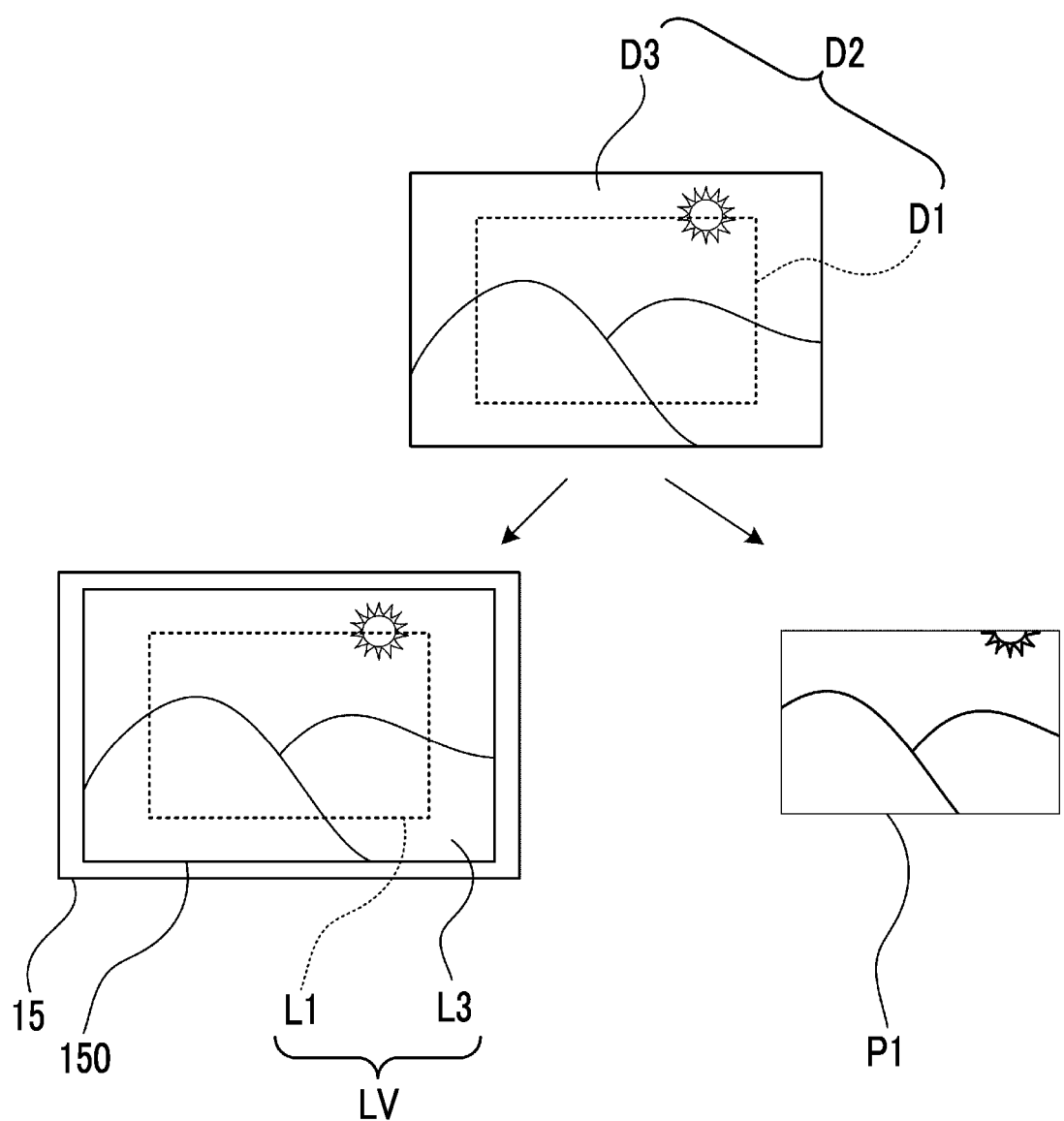
FIG. 4 is a diagram schematically illustrating the live view image and a crop recording image in a crop recording mode.

FIG. 4 is a diagram schematically illustrating the live view image and the crop recording image in the crop recording mode. In the crop recording mode, the live view image LV is generated from the captured image signal D2 output from the light-receiving region 120 of the imaging element 12 and is displayed on the display surface 150 of the display unit 15.

The captured image signal D2 illustrated in FIG. 4 is configured with an image signal D1 output from the crop region 121 and an image signal D3 output from the edge part region 122. The live view image LV is configured with an image L1 (image generated from the image signal D1) corresponding to the crop region 121 and an image L3 (image generated from the image signal D3) corresponding to the edge part region 122. In a case where the imaging instruction is provided in the crop recording mode, a crop recording image P1 is generated from the image signal D1 of the captured image signal D2 and is recorded on the recording medium 19. As illustrated in FIG. 4, in the crop recording mode, a range that is not recorded on the recording medium 19 in the subject image formed in the light-receiving region 120 can also be checked on the display unit 15 as the image L3.

In imaging the subject by the imaging element 12, the system control unit 18 corrects a shake (image shake) of the captured image output from the imaging element 12 by controlling the imaging element shift mechanism 13 based on motion information of the digital camera 1 detected by the motion detection sensor 17.

Figure 5:
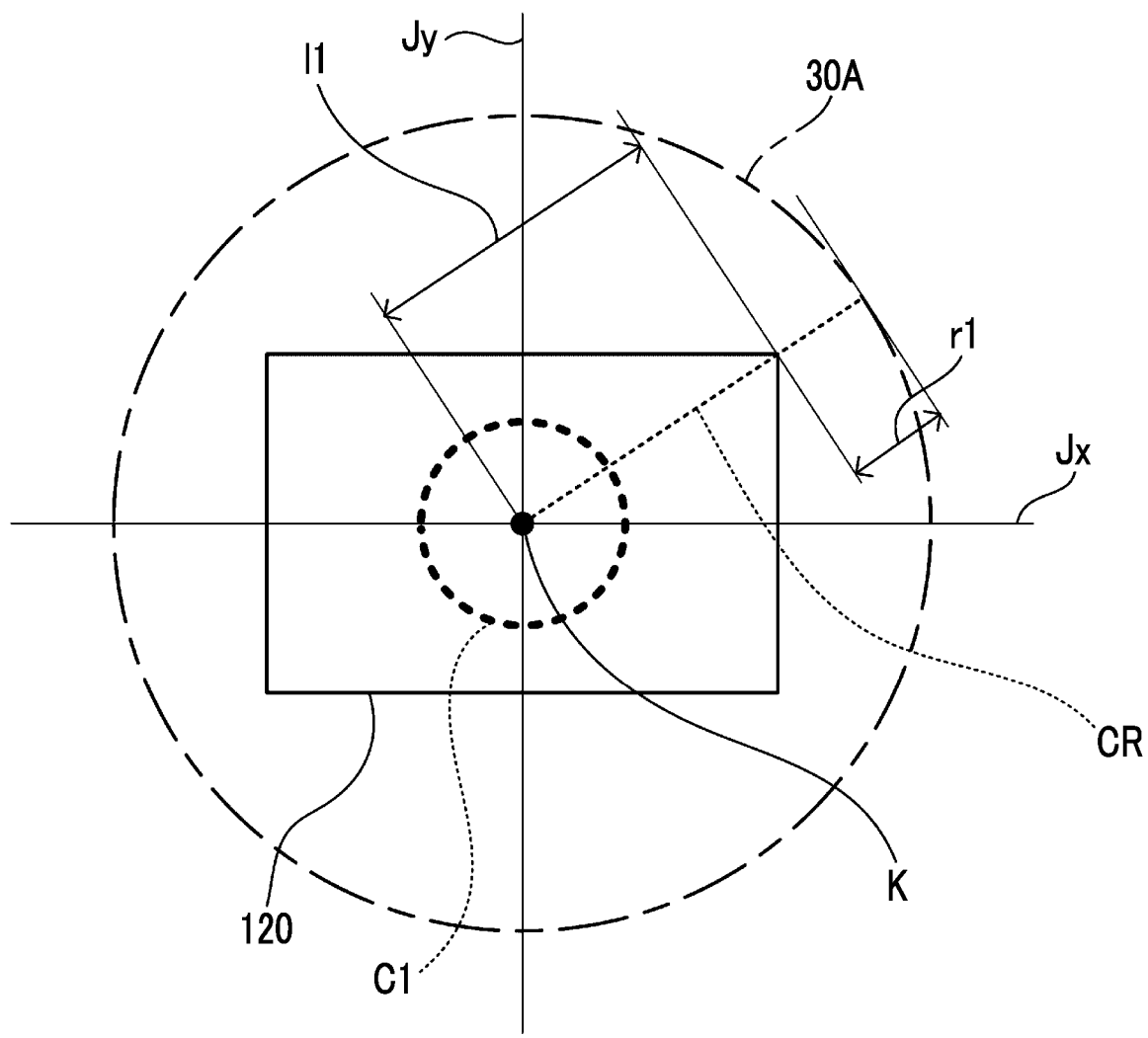
FIG. 5 is a schematic diagram for describing a movable range of the imaging element 12 in the normal recording mode.

FIG. 5 is a schematic diagram for describing a movable range of the imaging element 12 in the normal recording mode. FIG. 5 illustrates the light-receiving region 120 seen in the direction of the optical axis K and an image circle 30A of the imaging optical system 30. The image circle 30A illustrates an allowable range of image quality of the subject image formed in the light-receiving region 120 of the imaging element 12. In FIG. 5, the image circle 30A is a perfect circle centered at the optical axis K.

In a state where the digital camera 1 stands still, the system control unit 18 matches a center of the light-receiving region 120 to the optical axis K as illustrated in FIG. 5 by controlling a position of the imaging element 12 through the imaging element shift mechanism 13. In FIG. 5, an axis Jx and an axis Jy that are orthogonal to each other at the optical axis K as an origin are illustrated. The axis Jx is an axis that extends in a direction (row direction X) in which a long side of the light-receiving region 120 extends. The axis Jy is an axis that extends in a direction (column direction Y) in which a short side of the light-receiving region 120 extends. The imaging element 12 is moved in an extending direction of the axis Jx and an extending direction of the axis Jy by the imaging element shift mechanism 13.

In the normal recording mode, the system control unit 18 performs image shake correction by moving the imaging element 12 so that the light-receiving region 120 does not stay outside the image circle 30A. Accordingly, image quality of the normal recording image can be set to an allowable level. That is, the system control unit 18 controls the movable range (movable range of the center of the light-receiving region 120) of the imaging element 12 in the normal recording mode within a range of a circle C1 of which a radius is a difference r1 between a radius CR of the image circle 30A and a diagonal length l1 (length of a half of a diagonal line) of the light-receiving region 120.

Figure 6:
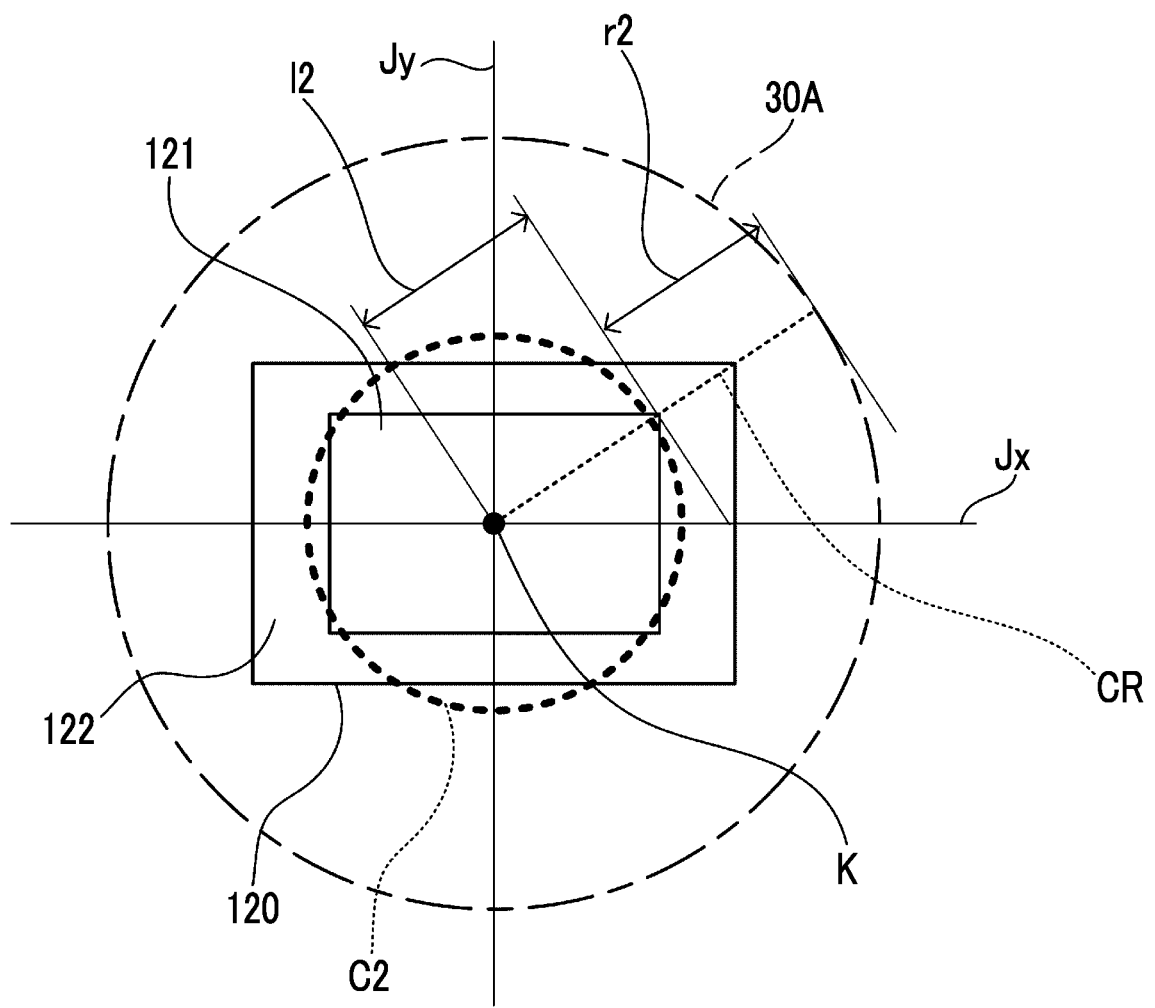
FIG. 6 is a schematic diagram for describing the movable range of the imaging element 12 in the crop recording mode.

FIG. 6 is a schematic diagram for describing the movable range of the imaging element 12 in the crop recording mode. In the crop recording mode, the system control unit 18 performs image shake correction by moving the imaging element 12 so that the crop region 121 of the light-receiving region 120 does not stay outside the image circle 30A. Accordingly, image quality of the crop recording image can be set to an allowable level. That is, the system control unit 18 controls the movable range of the imaging element 12 in the crop recording mode within a range of a circle C2 of which a radius is a difference r2 between the radius CR of the image circle 30A and a diagonal length l2 (length of a half of a diagonal line) of the crop region 121. The diagonal length l2 of the crop region 121 is a value obtained by dividing the diagonal length l1 of the light-receiving region 120 by the crop ratio β. That is, the circle C2 having the radius of the difference r2 is larger than the circle C1 having the radius of the difference r1.

The system control unit 18 performs a control of setting the movable range of the imaging element 12 in the normal recording mode based on sizes of the image circle 30A and the light-receiving region 120 and setting the movable range of the imaging element 12 to be greater than in the normal recording mode based on the crop ratio β in the crop recording mode. The crop ratio β may be set to a plurality of values.

Figure 7:
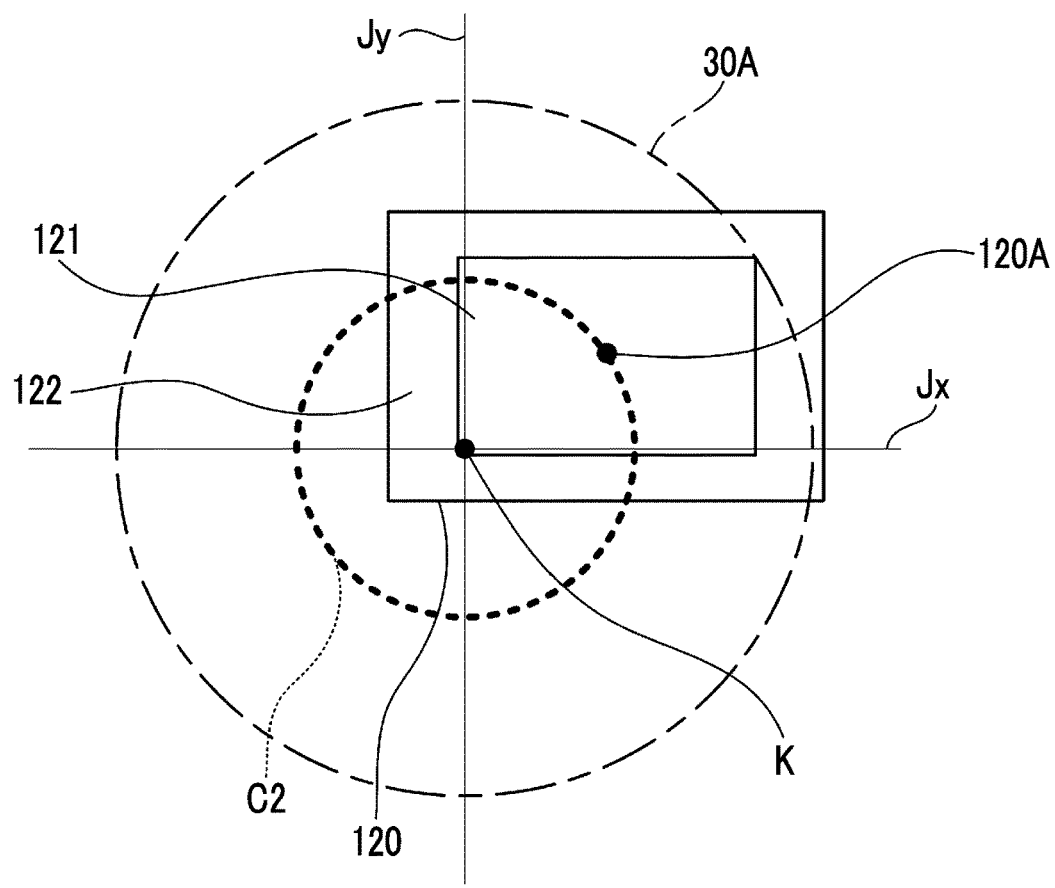
FIG. 7 is a diagram illustrating a state where the imaging element 12 is moved to an end of the movable range in the crop recording mode.

FIG. 7 is a diagram illustrating a state where the imaging element 12 is moved to an end of the movable range in the crop recording mode. As illustrated in FIG. 7, in a state where a center 120A of the light-receiving region 120 is on a circumference of the circle C2, a part of the edge part region 122 of the imaging element 12 stays outside the image circle 30A. Accordingly, there is a possibility that the image L3 (refer to FIG. 5) that is a part corresponding to the edge part region 122 in the live view image LV displayed in the crop recording mode has an unallowable level of image quality. On the other hand, in the normal recording mode, the light-receiving region 120 does not stay outside the image circle 30A. Thus, the image L3 that is a part corresponding to the edge part region 122 in the live view image LV has an allowable level of image quality.

In order to improve the image quality (visibility) of the image L3 of the live view image LV in the crop recording mode, the system control unit 18 performs a control of setting an image processing parameter related to the visibility of the image L3, in other words, a parameter used for image processing performed on the image signal D3 output from the edge part region 122 in the captured image signal D2, differently from the image processing parameter of the image L3 in the normal recording mode. The visibility of the image is decided by brightness, sharpness, distortion, color, or the like.

The image processing parameter includes a brightness gain by which a pixel signal of each pixel is multiplied in order to perform brightness shading correction, an outline highlight gain by which the pixel signal of each pixel is multiplied in order to perform outline highlighting, intensity of the noise correction of each pixel, intensity of the distortion correction of each pixel, correction intensity of the lateral chromatic aberration of each pixel, intensity of the fringe correction of each pixel, and the like.

Figure 8:
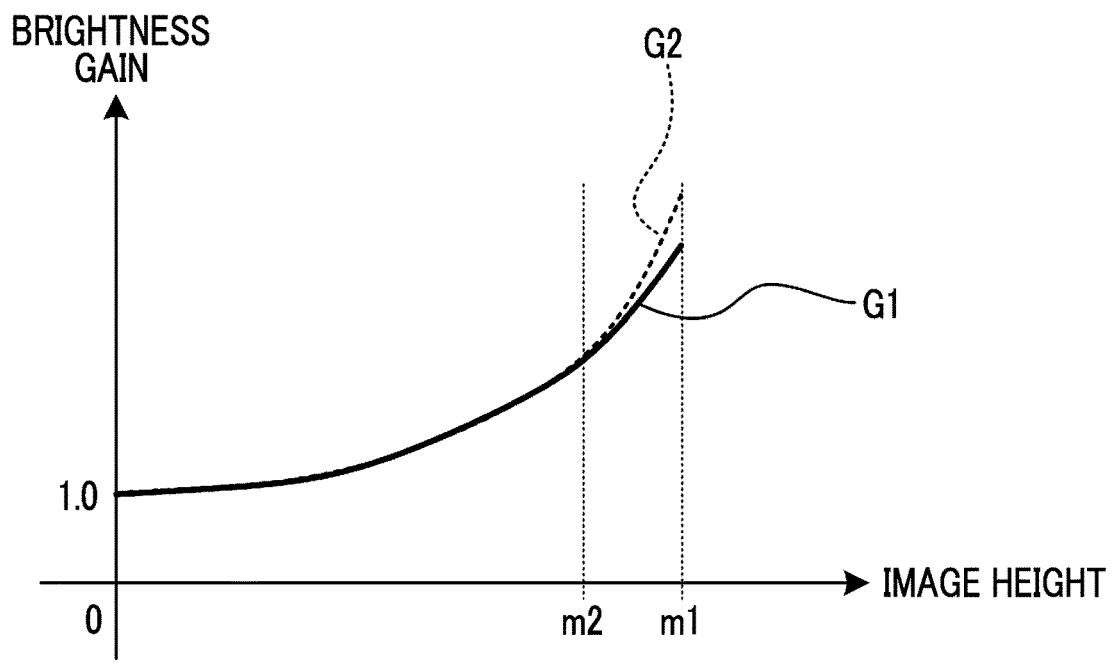
FIG. 8 is a schematic diagram illustrating an example of a brightness gain used for brightness shading correction.

FIG. 8 is a schematic diagram illustrating an example of the brightness gain used for the brightness shading correction. Data G1 illustrates the brightness gain used in generating the live view image in the normal recording mode. Data G2 illustrates the brightness gain used in generating the live view image in the crop recording mode. An image height m1 denotes a position of a pixel on an edge of the light-receiving region 120. An image height m2 denotes a position of a pixel on an edge of the crop region 121.

As illustrated in FIG. 7, in the crop recording mode, ranges of the image height m1 and the image height m2 in FIG. 8, that is, a degree of each of a decrease in brightness, a decrease in sharpness, an increase in distortion, and an increase in color shift of the subject image formed in the edge part region 122 with respect to the subject image formed at the center of the light-receiving region 120, may be greater than in the normal recording mode. Accordingly, as illustrated in FIG. 8, in the crop recording mode, the brightness gain by which each pixel of the image signal D3 output from the edge part region 122 is multiplied is set to a greater value than in the normal recording mode. In addition, in the crop recording mode, the system control unit 18 sets the outline highlight gain by which each pixel of the image signal D3 output from the edge part region 122 is multiplied to a greater value than in the normal recording mode. In addition, in the crop recording mode, the system control unit 18 sets the intensity of each of the noise correction, the distortion correction, the lateral chromatic aberration correction, and the fringe correction of the image signal D3 output from the edge part region 122 to be higher than in the normal recording mode. Accordingly, occurrence of a change in the visibility of the image L3 of the live view image LV between the normal recording mode and the crop recording mode can be prevented.

Figure 9:
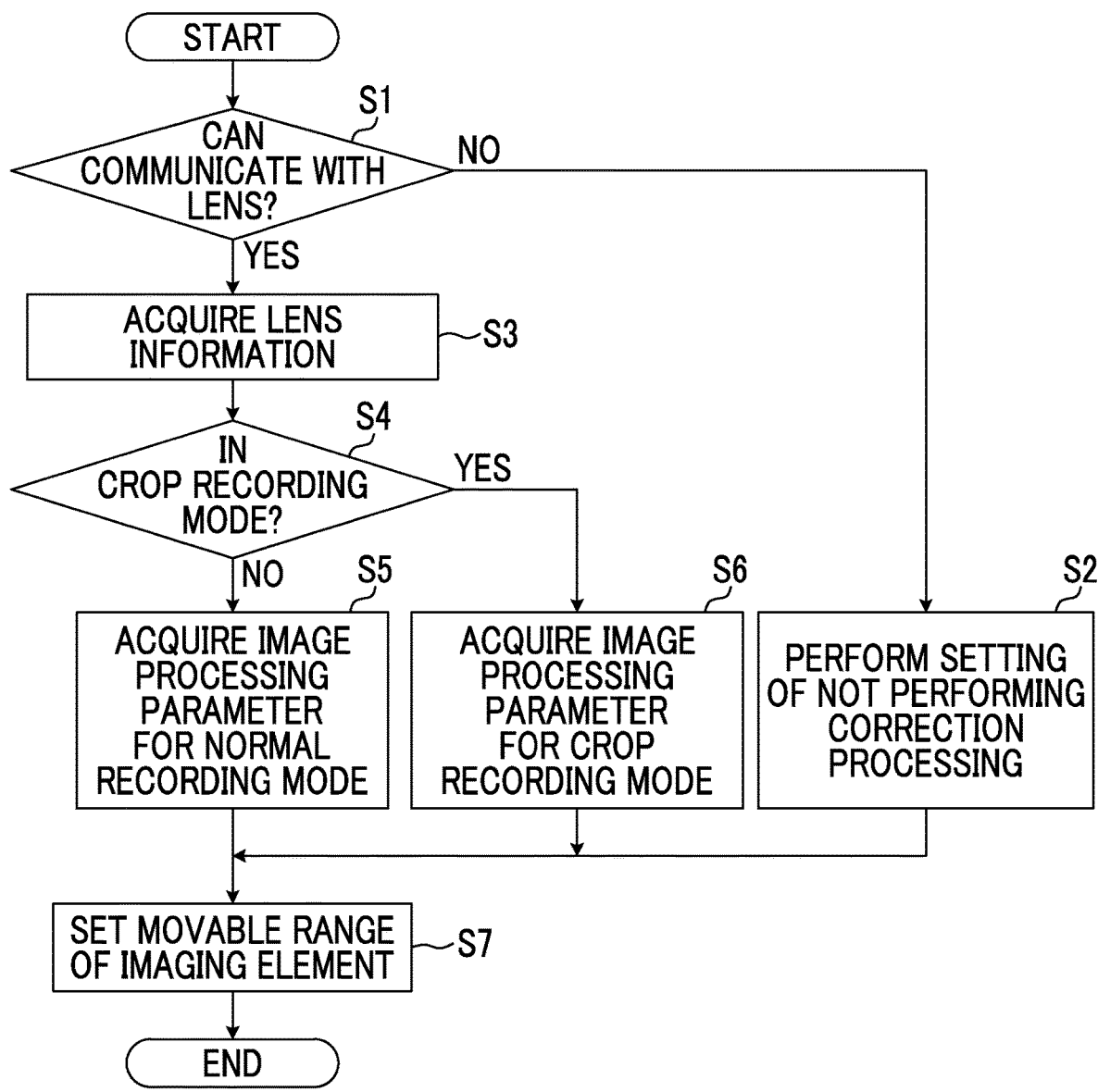
FIG. 9 is a flowchart for describing an operation of the digital camera 1.

FIG. 9 is a flowchart for describing an operation of the digital camera 1. In a case where the digital camera 1 is powered on, the system control unit 18 attempts to communicate with the lens control unit 40 of the lens device 20. In a case where communication with the lens device 20 is not available (step S1: NO), the system control unit 18 performs setting of omitting the correction processing as image processing in generating the live view image (step S2).

In a case where communication with the lens device 20 is available (step S1: YES), the system control unit 18 acquires lens information of the lens device 20 from the lens control unit 40 (step S3). The lens information is information necessary for determining the image circle 30A of the imaging optical system 30.

After the lens information is acquired, the system control unit 18 determines whether the imaging mode is the normal recording mode or the crop recording mode (step S4). In a case where the imaging mode is the normal recording mode (step S4: NO), the system control unit 18 reads out the image processing parameter for the normal recording mode from the ROM of the memory 16 and sets the image processing parameter as a parameter used in generating the normal recording image and the live view image (step S5).

In a case where the imaging mode is the crop recording mode (step S4: YES), the system control unit 18 reads out the image processing parameter for the crop recording mode from the ROM of the memory 16 and sets the image processing parameter as a parameter used in generating the crop recording image and the live view image (step S6).

After processing in any of step S2, step S5, and step S6, the system control unit 18 sets the movable range of the imaging element 12 for performing image shake correction (step S7). After processing in step S5, the system control unit 18 sets a first movable range as the movable range of the imaging element 12. After processing in step S6, the system control unit 18 sets a second movable range larger than the first movable range as the movable range of the imaging element 12. After processing in step S2, for example, the system control unit 18 sets any value such as a maximum value or a minimum value that can be set as the movable range of the imaging element 12.

As described above, according to the digital camera 1, in the crop recording mode, since the movable range of the imaging element 12 for image shake correction can be set to be larger than in the normal recording mode, a larger image shake can be corrected. In addition, since visibility of an edge part of the live view image displayed in the crop recording mode can be set to be the same as in the normal recording mode, the subject can be favorably checked.

The movable range of the imaging element 12 in the normal recording mode can also be set to a circle larger than the circle C1 as long as image quality of an edge part of the normal recording image in a case where an edge part of the light-receiving region 120 stays outside the image circle 30A falls within an allowable range (the image quality can be set to fall within the allowable range by image processing). That is, the movable range of the imaging element 12 in the normal recording mode can be decided in accordance with an allowable degree of image quality of the normal recording image. By increasing the movable range of the imaging element 12, stronger shake correction can be performed.

First Modification Example of Digital Camera 1

As described so far, quality of the live view image LV is improved by preventing a decrease in edge part image quality of the live view image LV in the crop recording mode. Conversely, the quality of the live view image LV may be improved by causing a decrease in edge part image quality of the live view image LV to not stand out in the crop recording mode.

That is, the system control unit 18 may perform a control of setting the visibility of the part corresponding to the edge part region 122 in the live view image LV generated in the crop recording mode to be lower than in the normal recording mode. Specifically, in the crop recording mode, the system control unit 18 controls the parameter of image processing performed on the image signal D3 in the captured image signal D2 illustrated in FIG. 4 to a state where the visibility is set to be lower than in the normal recording mode. That is, in the crop recording mode, the system control unit 18 sets at least one of brightness (brightness gain) or sharpness (outline highlight gain) of the image L3 of the live view image LV to be lower than in the normal recording mode.

Figure 10:
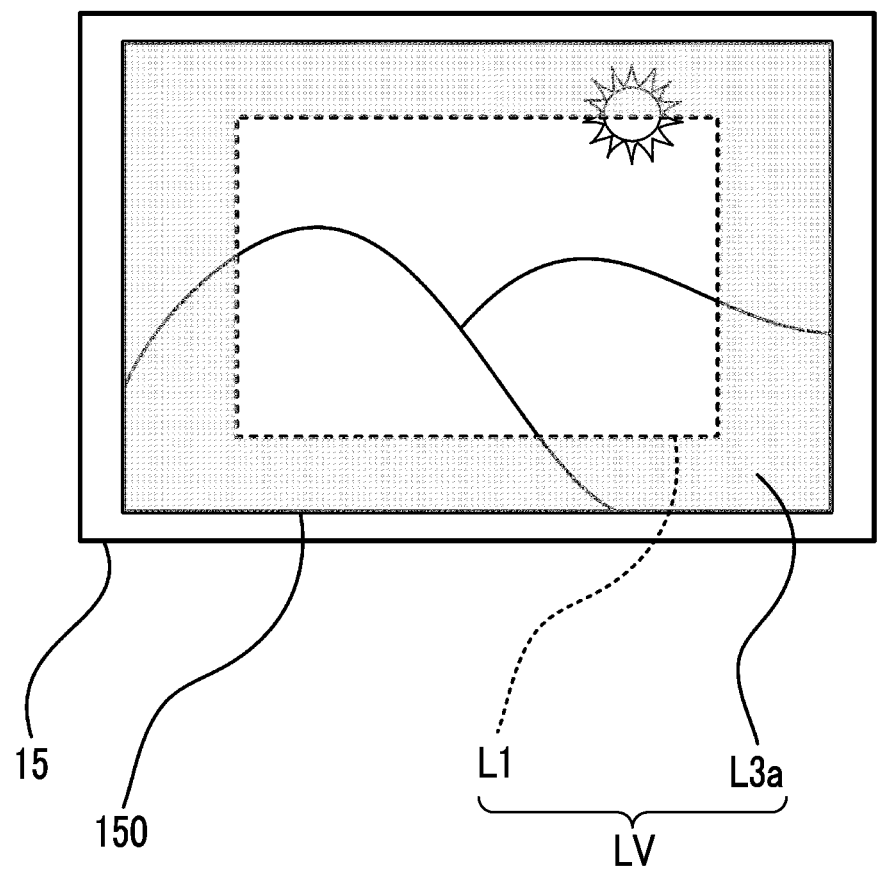
FIG. 10 is a diagram schematically illustrating the live view image after semi-transparent processing.

More specifically, in the crop recording mode, the system control unit 18 may decrease the visibility of the image L3 by generating the live view image LV using the same image processing parameter as in the normal recording mode and then, performing semi-transparent processing on the image L3. FIG. 10 is a diagram schematically illustrating the live view image after the semi-transparent processing. The live view image LV illustrated in FIG. 10 is configured with the image L1 and an image L3a after the semi-transparent processing on the image L3.

The semi-transparent processing corresponds to processing of setting the brightness or the sharpness of the image L3 to be lower than in the normal recording mode. The semi-transparent processing may be performed in the system control unit 18 but is preferably performed in a driver included in the display unit 15. By performing the semi-transparent processing in the display unit 15, a load of the system control unit 18 can be decreased.

Figure 11:
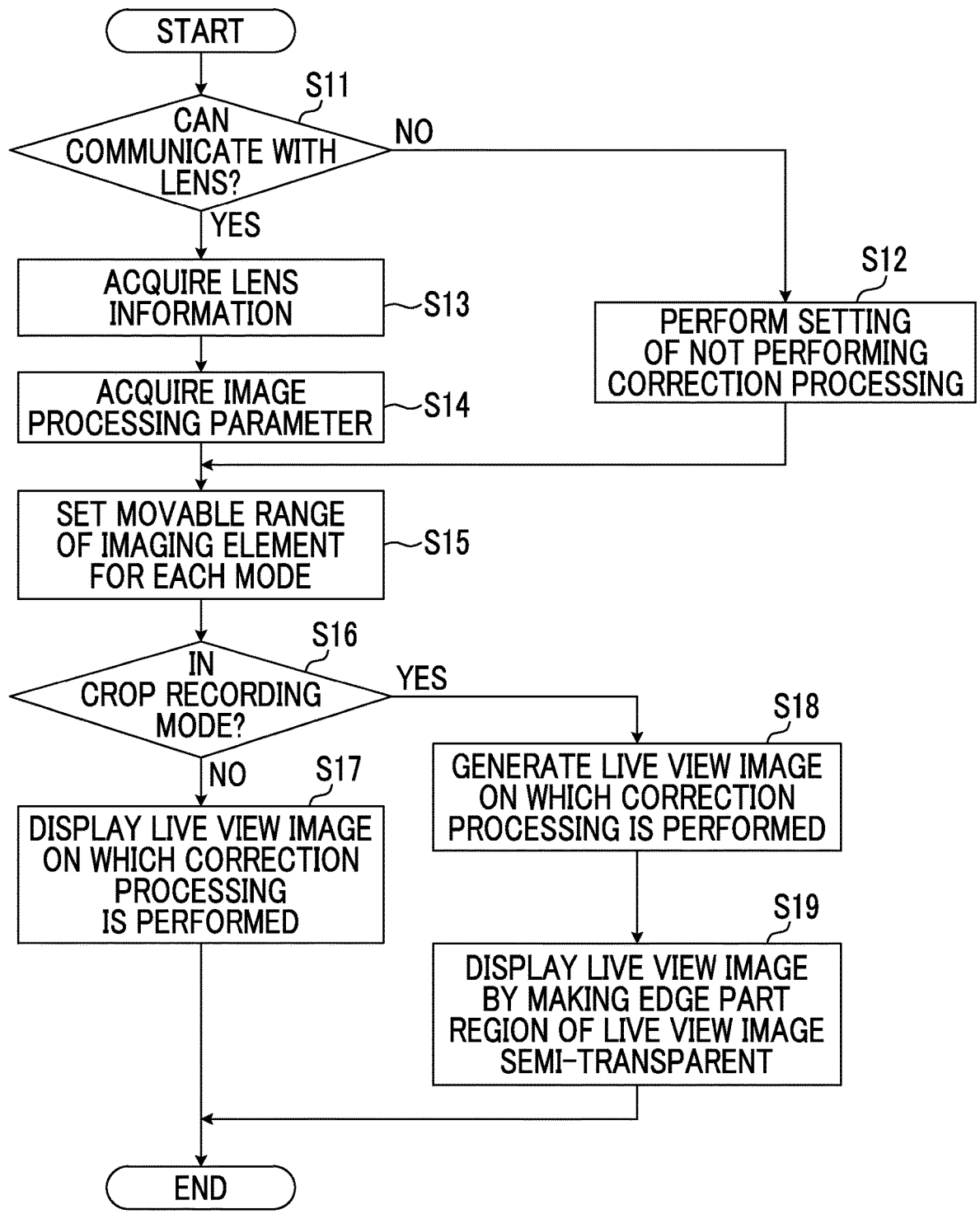
FIG. 11 is a flowchart for describing the operation of the digital camera 1 in a case of decreasing edge part image quality of the live view image by performing the semi-transparent processing.

FIG. 11 is a flowchart for describing the operation of the digital camera 1 in a case of decreasing the edge part image quality of the live view image by performing the semi-transparent processing. In a case where the digital camera 1 is powered on, the system control unit 18 attempts to communicate with the lens control unit 40 of the lens device 20. In a case where communication with the lens device 20 is not available (step S11: NO), the system control unit 18 performs setting of omitting the correction processing as image processing in generating the live view image (step S12).

In a case where communication with the lens device 20 is available (step S11: YES), the system control unit 18 acquires the lens information of the lens device 20 from the lens control unit 40 (step S13).

After the lens information is acquired, the system control unit 18 reads out the image processing parameter for the normal recording mode from the ROM of the memory 16 and sets the image processing parameter as a parameter used in generating each of the normal recording image, the crop recording image, and the live view image (step S14).

Next, the system control unit 18 sets the movable range of the imaging element 12 in performing image shake correction in the normal recording mode and sets the movable range of the imaging element 12 in performing image shake correction in the crop recording mode based on the lens information and the crop ratio β (step S15).

Next, in a case where the imaging mode is the normal recording mode (step S16: NO), the system control unit 18 generates the live view image by processing the captured image signal output from the light-receiving region 120 of the imaging element 12 using the image processing parameter set in step S14 and displays the live view image on the display unit 15 (step S17).

In a case where the imaging mode is the crop recording mode (step S16: YES), the system control unit 18 generates the live view image by processing the captured image signal output from the light-receiving region 120 of the imaging element 12 using the image processing parameter set in step S14 (step S18). The system control unit 18 performs the semi-transparent processing on the image of the part corresponding to the edge part region 122 in the live view image and displays the live view image after the semi-transparent processing on the display unit 15 (step S19).

According to the operation illustrated in FIG. 11, the image processing parameter can be used in common between the normal recording mode and the crop recording mode. Thus, reduction of a memory capacity, efficient image processing, and the like can be achieved.

Second Modification Example of Digital Camera 1

In a case where communication with the lens device 20 is not available, the system control unit 18 may set the movable range of the imaging element 12 in image shake correction in accordance with a focal length set value set from a user regardless of whether the imaging mode is the normal recording mode or the crop recording mode. Specifically, the system control unit 18 increases the movable range as the focal length set value is increased. Accordingly, image shake correction performance suitable for an imaging condition is obtained.

Third Modification Example of Digital Camera 1

Even in a case where the crop ratio β can be set to a plurality of values, it is preferable that the system control unit 18 fixes the crop ratio β to a predetermined value in a case where communication with the lens device 20 is not available. In addition, in a case where communication with the lens device 20 is not available, it is preferable that the system control unit 18 fixes the movable range of the imaging element 12 to a predetermined range regardless of whether the imaging mode is the normal recording mode or the crop recording mode. Accordingly, a decrease in captured image quality can be prevented.

Fourth Modification Example of Digital Camera 1

Even in the crop recording mode, the system control unit 18 may control the movable range of the imaging element 12 to the same range as in the normal recording mode during a period (period in which imaging for generating the live view image is performed) in which the imaging instruction is not provided, and control the movable range of the imaging element 12 to a wide range for the crop recording mode in a case where the imaging instruction is provided to set a state for performing imaging for recording. By doing so, image quality can be guaranteed over the entire range of the live view image in the crop recording mode.

In a case where imaging for recording is finished and returns to imaging for generating the live view image, it is preferable that the display of the live view image is resumed after moving the imaging element 12 so that the light-receiving region 120 falls within the movable range of the imaging element 12 in the normal recording mode. By doing so, it is possible that the motion of the imaging element 12 caused by rapidly changing the movable range is not recognized by the user.

Fifth Modification Example of Digital Camera 1

As described so far, the camera body 10 of the digital camera 1 has an in-body vibration-proof function of performing image shake correction by moving the imaging element 12. The digital camera 1 of a fifth modification example has an optical vibration-proof function of performing image shake correction by moving a vibration-proof lens included in the imaging optical system 30 of the lens device 20 instead of moving the imaging element 12. In the digital camera 1 having the optical vibration-proof function instead of the in-body vibration-proof function, the movable range of the imaging element 12 described above is replaced with a movable range of the vibration-proof lens. That is, the system control unit 18 sets the movable range of the vibration-proof lens to, for example, the range of the circle C1 in FIG. 5 in the normal recording mode, and sets the movable range of the vibration-proof lens to, for example, the range of the circle C2 in FIG. 6 in the crop recording mode.

Figure 12:
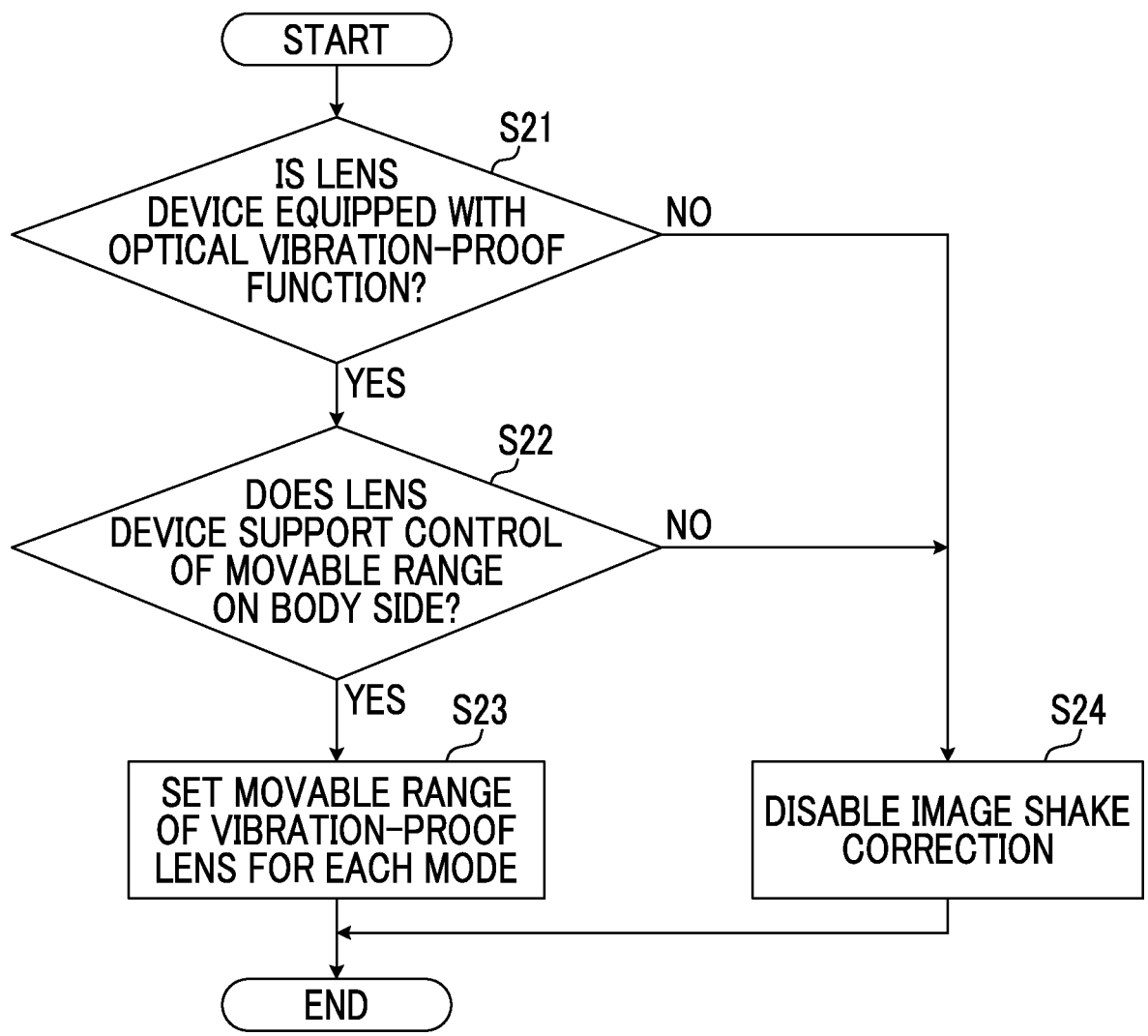
FIG. 12 is a flowchart for describing an operation of a digital camera of a fifth modification example.

FIG. 12 is a flowchart for describing an operation of the digital camera of the fifth modification example. In a case where the digital camera 1 is powered on, the system control unit 18 communicates with the lens device 20 and determines whether or not the lens device 20 is equipped with the optical vibration-proof function (step S21). In a case where the lens device 20 is not equipped with the optical vibration-proof function (step S21: NO), the system control unit 18 disables an image shake correction function (step S24).

In a case where the lens device 20 is equipped with the optical vibration-proof function (step S21: YES), the system control unit 18 determines whether or not the lens device 20 supports setting (change) of the movable range of the vibration-proof lens from an outside (step S22). In a case where the determination in step S22 results in NO, the system control unit 18 disables the image shake correction function (step S24).

In a case where the determination in step S22 results in YES, the system control unit 18 sets the movable range of the vibration-proof lens in performing image shake correction in the normal recording mode and sets the movable range of the vibration-proof lens in performing image shake correction in the crop recording mode based on the lens information of the lens device 20 and the crop ratio β (step S23).

Even in the digital camera having only the optical vibration-proof function, it is possible to improve the image shake correction performance and improve the quality of the live view image.

Sixth Modification Example of Digital Camera 1

Figure 13:
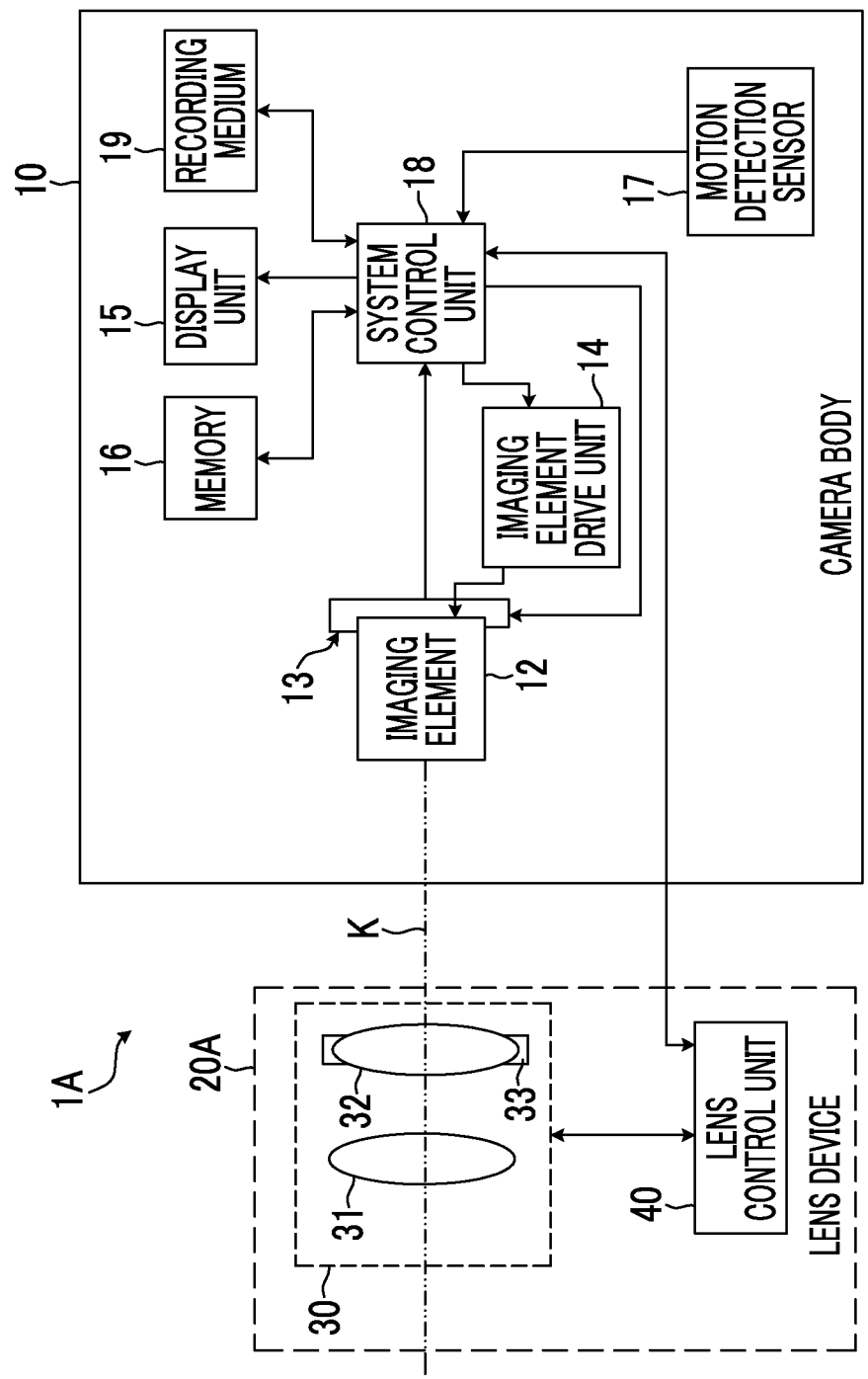
FIG. 13 is a schematic diagram illustrating a sixth modification example of the digital camera 1 in FIG. 1.

The digital camera 1 may have the optical vibration-proof function in addition to the in-body vibration-proof function. FIG. 13 is a schematic diagram illustrating a sixth modification example of the digital camera 1 in FIG. 1. A hardware configuration of a digital camera 1A illustrated in FIG. 13 is the same as the digital camera 1 in FIG. 1 except that the lens device 20 is changed to a lens device 20A. In the digital camera 1A, the lens device 20A can also be interchanged with the lens device 20 not having the optical vibration-proof function.

The lens device 20A has the same configuration as the lens device 20 except that a vibration-proof lens 32 and a vibration-proof lens drive mechanism 33 that drives the vibration-proof lens 32 are added to the imaging optical system 30.

The vibration-proof lens 32 is a lens for correcting an image shake. The vibration-proof lens drive mechanism 33 moves the vibration-proof lens 32 in a direction orthogonal to the optical axis K of the imaging optical system 30 based on an instruction from the lens control unit 40. The image shake is optically corrected by moving the vibration-proof lens 32 in the direction orthogonal to the optical axis K.

In the digital camera 1A, the image shake is corrected by moving the vibration-proof lens 32 by the lens control unit 40 and moving the imaging element 12 by the system control unit 18 based on the motion information of the digital camera 1A detected by the motion detection sensor 17.

In a case of correcting the image shake using both of the optical vibration-proof function and the in-body vibration-proof function, the system control unit 18 corrects the image shake by offsetting a part of the motion of the digital camera 1A by the vibration-proof lens 32 and offsetting the rest of the motion by the imaging element 12.

In the normal recording mode, for example, the system control unit 18 allocates the circle C1 having the radius of the difference r1 illustrated in FIG. 5 at an equal ratio between the vibration-proof lens 32 and the imaging element 12. The system control unit 18 sets the movable range of the imaging element 12 to a range of a circle having a radius of 0.5 times the difference r1 and sets the movable range of the vibration-proof lens 32 to a range of a circle having a radius of 0.5 times the difference r1. This allocation ratio is decided based on a mechanical upper limit to which the vibration-proof lens 32 in the lens device mounted in the camera body 10 of the digital camera 1A can be moved and a mechanical upper limit to which the imaging element 12 can be moved.

In the crop recording mode, for example, the system control unit 18 allocates the circle C2 having the radius of the difference r2 illustrated in FIG. 6 at a ratio between the vibration-proof lens 32 and the imaging element 12 based on the crop ratio β. Specifically, in a case of crop ratio β=1.2, β1 and β2 of an allocation ratio β1:2 between the vibration-proof lens 32 and the imaging element 12 are set such that β1×β2=1.2 is satisfied. A range of a circle having a radius of {β1/(β1+β2)} times the difference r2 is set as the movable range of the vibration-proof lens 32. A range of a circle having a radius of {β2/(β1+β2)} times the difference r2 is set as the movable range of the imaging element 12. Based on the allocation ratio depending on the crop ratio β, the system control unit 18 sets at least one of the movable range of the vibration-proof lens 32 or the movable range of the imaging element 12 to be larger than in the normal recording mode so that the crop region 121 does not stay outside the image circle 30A.

Figure 14:
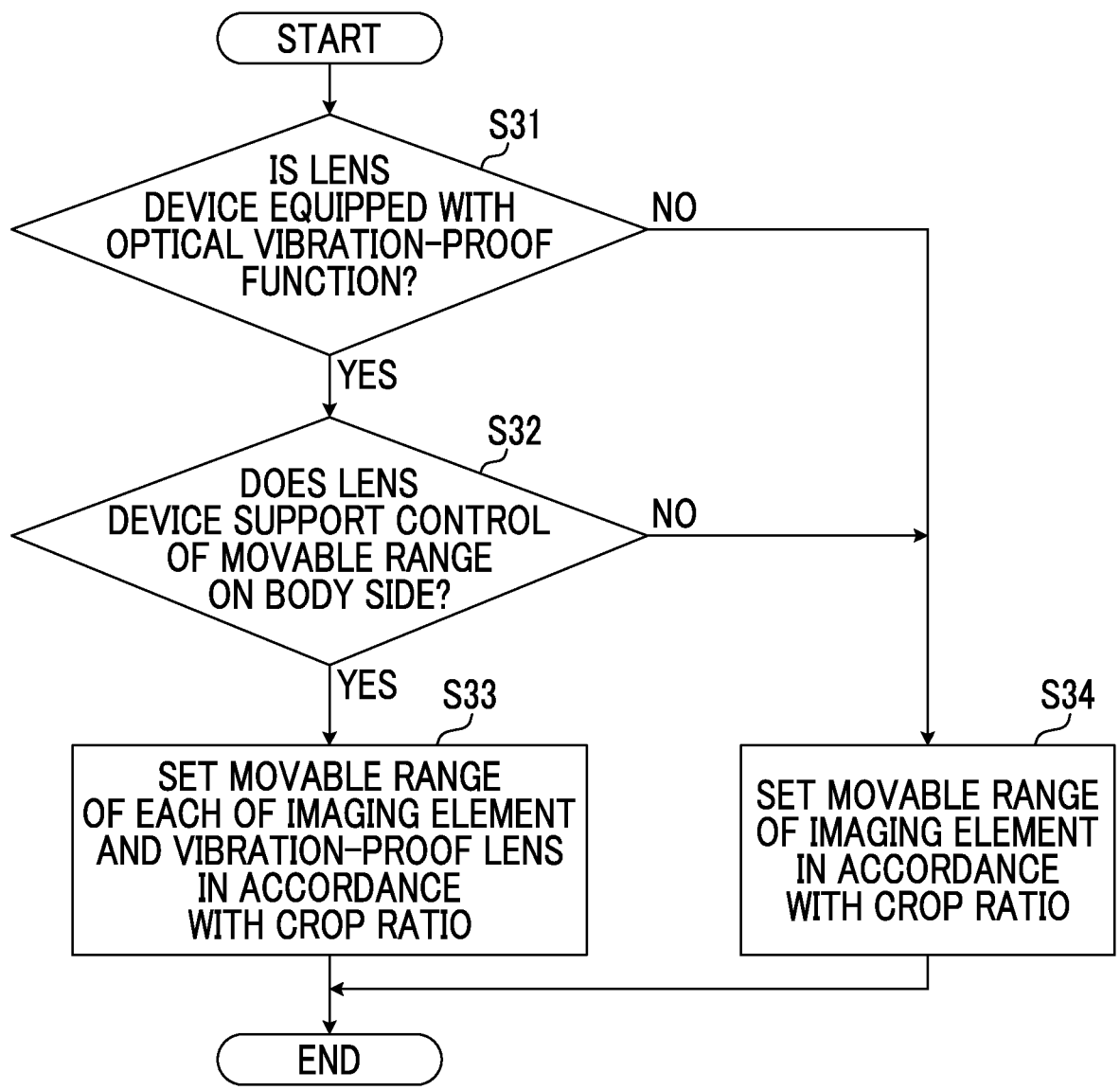
FIG. 14 is a flowchart for describing an operation of the digital camera of the sixth modification example in the crop recording mode.

FIG. 14 is a flowchart for describing an operation of the digital camera of the sixth modification example in the crop recording mode. In a case where the digital camera 1A is powered on, the system control unit 18 communicates with a mounted lens device and determines whether or not the lens device is equipped with the optical vibration-proof function (step S31). In a case where the lens device is not equipped with the optical vibration-proof function (step S31: NO), the system control unit 18 sets the movable range of the imaging element 12 based on the crop ratio β (step S34).

In a case where the lens device is equipped with the optical vibration-proof function (step S31: YES), that is, in a case where the lens device 20A is mounted, the system control unit 18 determines whether or not the lens device 20A supports setting (change) of the movable range of the vibration-proof lens 32 from the outside (step S32). In a case where the determination in step S32 results in NO, the system control unit 18 disables the optical vibration-proof function and processes step S34. For example, the determination in step S32 results in NO in a case where firmware of the lens device 20A is not updated.

In a case where the determination in step S32 results in YES, the system control unit 18 sets the movable range of each of the imaging element 12 and the vibration-proof lens 32 based on the lens information of the lens device 20A and the crop ratio β (step S33).

Even in the digital camera using the optical vibration-proof function and the in-body vibration-proof function together, it is possible to improve the image shake correction performance and improve the quality of the live view image.

Next, a configuration of a smartphone will be described as the imaging apparatus according to the embodiment of the present invention.

Figure 15:
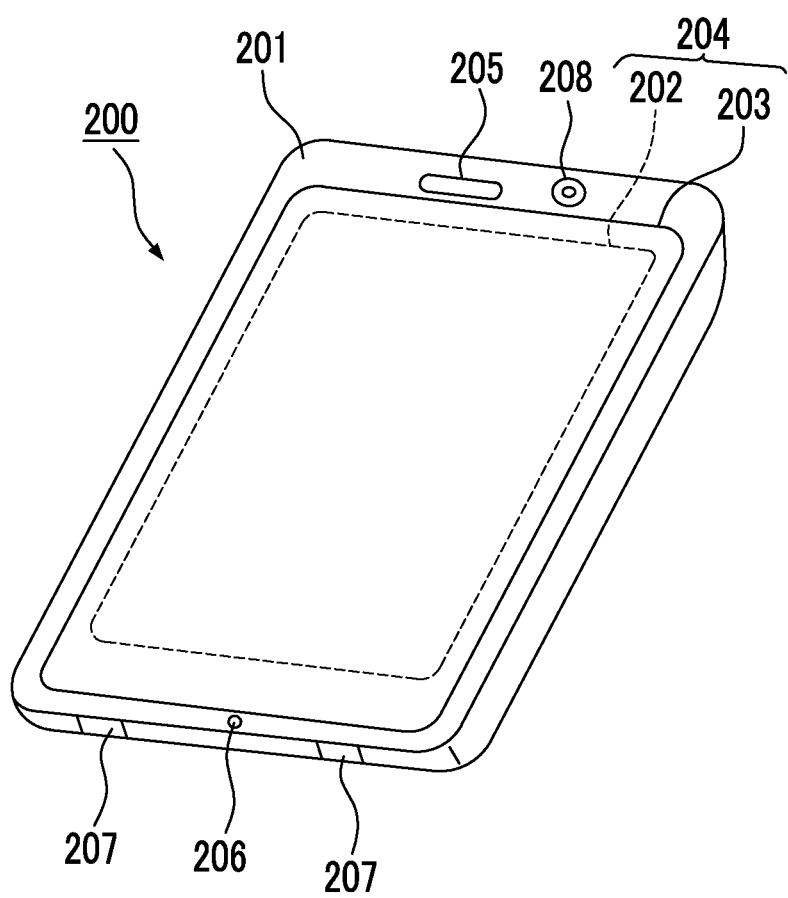
FIG. 15 illustrates an exterior of a smartphone 200 that is one embodiment of the imaging apparatus according to the present invention.

FIG. 15 illustrates an exterior of a smartphone 200 that is one embodiment of the imaging apparatus according to the present invention.

The smartphone 200 illustrated in FIG. 15 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 16:
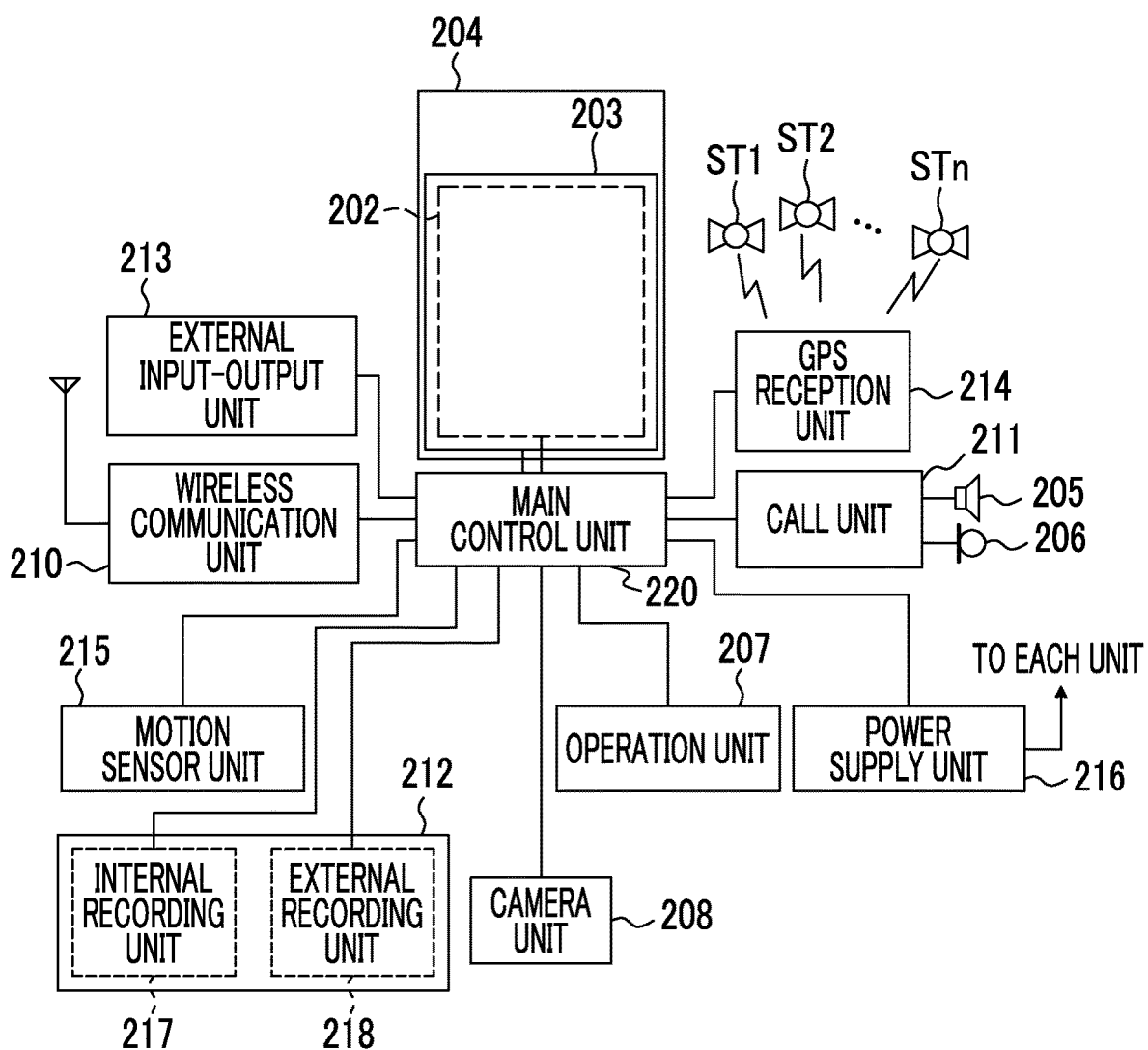
FIG. 16 is a block diagram illustrating a configuration of the smartphone 200 illustrated in FIG. 15.

FIG. 16 is a block diagram illustrating a configuration of the smartphone 200 illustrated in FIG. 15.

As illustrated in FIG. 16, a wireless communication unit 210, the display and input unit 204, a call unit 211, the operation unit 207, the camera unit 208, a recording unit 212, an external input-output unit 213, a global navigation satellite system (GNSS) (in FIG. 16, referred to as a global positioning system (GPS) as an example) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus accommodated in the mobile communication network in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 16, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion other than the overlapping part that does not overlap with the display panel 202.

A size of the display region and a size of the display panel 202 may completely match, but both sizes do not need to match. In addition, the operation panel 203 may comprise two sensitive regions of the outer edge portion and an inner part other than the outer edge portion. Furthermore, a width of the outer edge portion is appropriately designed depending on a size and the like of the casing 201.

Furthermore, as a position detection type employed in the operation panel 203, a matrix switch type, a resistive film type, a surface acoustic wave type, an infrared type, an electromagnetic induction type, a capacitance type, and the like are exemplified, and any of the types can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 15, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 16, the operation unit 207 is a push-button type switch that is mounted on a side surface of the casing 201 of the smartphone 200 and is set to an ON state in a case where the switch is pressed by the finger or the like, and set to an OFF state by restoring force of a spring or the like in a case where the finger is released.

In the recording unit 212, a control program and control data of the main control unit 220, application software, address data in which a name, a telephone number, or the like of a communication counterpart is associated, transmitted and received electronic mail data, web data downloaded by web browsing, and downloaded contents data are recorded, and streaming data or the like is temporarily recorded. In addition, the recording unit 212 is configured with an internal recording unit 217 incorporated in the smartphone and an external recording unit 218 that includes a slot for an attachable and detachable external memory.

Each of the internal recording unit 217 and the external recording unit 218 constituting the recording unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication (for example, a universal serial bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes position measurement calculation processing based on the received plurality of GPS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. A detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data recorded in the recording unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software recorded in the recording unit 212. For example, the application processing function is an infrared communication function of performing data communication with counter equipment by controlling the external input-output unit 213, an electronic mail function of transmitting and receiving electronic mails, or a web browsing function of browsing a web page.

In addition, the main control unit 220 has an image processing function such as displaying an image on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes a display control for the display panel 202 and an operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or the other outer edge portion (non-display region) not overlapping with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the configurations other than the memory 16 and the system control unit 18 in the digital camera 1 illustrated in FIG. 1. In a case where the smartphone 200 functions as the digital camera 1, the recording unit 212 and the recording medium 19 function as the memory 16, and the main control unit 220 functions as the system control unit 18.

Captured image data generated by the camera unit 208 can be recorded in the recording unit 212 or be output through the external input-output unit 213 or the wireless communication unit 210.

In the smartphone 200 illustrated in FIG. 15, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or by using the three-axis acceleration sensor together. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be recorded in the recording unit 212 or be output through the external input-output unit 213 or the wireless communication unit 210.

At least the following matters are disclosed in the present specification.

(1) A processor of an imaging apparatus including an imaging element that images a subject through an imaging optical system, the processor being configured to perform a recording control of performing any of first processing of recording a first captured image output from a first region of a light-receiving region of the imaging element and second processing of recording a second captured image output from a second region, which is larger than the first region, of the light-receiving region, perform an image shake correction control of correcting an image shake of a captured image output from the imaging element by moving one or both of the imaging element and a lens included in the imaging optical system, perform image processing of generating a live view image for displaying a subject image formed in the second region on a display unit, and perform a control of setting, in a case of performing the first processing, a movable range of at least one of the imaging element or the lens in the image shake correction control to be larger than in a case of performing the second processing.

(2) The processor of an imaging apparatus according to (1), in which the processor is configured to change an image processing parameter of a part corresponding to a third region that is a region excluding the first region in the second region of the live view image, between a case of performing the first processing and a case of performing the second processing.

(3) The processor of an imaging apparatus according to (2), in which the image processing parameter is a parameter related to visibility of an image.

(4) The processor of an imaging apparatus according to (3), in which the parameter is a parameter for deciding brightness or sharpness.

(5) The processor of an imaging apparatus according to (4), in which the processor is configured to, in a case of performing the first processing, set the part to be brighter or set sharpness of the part to be higher than in a case of performing the second processing.

(6) The processor of an imaging apparatus according to (4), in which the processor is configured to, in a case of performing the first processing, set the part to be darker or set sharpness of the part to be lower than in a case of performing the second processing.

(7) The processor of an imaging apparatus according to any one of (1) to (6), in which the processor is configured to decide the movable range in a case of performing the first processing based on a ratio of sizes of the first region and the second region.

(8) The processor of an imaging apparatus according to (7), in which the processor is configured to, in a case of correcting the image shake by moving both of the imaging element and the lens, decide the movable range of the imaging element based on a first allocation ratio allocated to the imaging element in the ratio and decide the movable range of the lens based on a second allocation ratio allocated to the lens in the ratio.

(9) An imaging apparatus comprising the processor according to any one of (1) to (8), and the imaging element.

(10) A control method of an imaging apparatus including an imaging element that images a subject through an imaging optical system, the method comprising performing a recording control of performing any of first processing of recording a first captured image output from a first region of a light-receiving region of the imaging element and second processing of recording a second captured image output from a second region, which is larger than the first region, of the light-receiving region, performing an image shake correction control of correcting an image shake of a captured image output from the imaging element by moving one or both of the imaging element and a lens included in the imaging optical system, performing image processing of generating a live view image for displaying a subject image formed in the second region on a display unit, and performing a control of setting, in a case of performing the first processing, a movable range of at least one of the imaging element or the lens in the image shake correction control to be larger than in a case of performing the second processing.

(11) The control method of an imaging apparatus according to (10), in which an image processing parameter of a part corresponding to a third region that is a region excluding the first region in the second region of the live view image is changed between a case of performing the first processing and a case of performing the second processing.

(12) The control method of an imaging apparatus according to (11), in which the image processing parameter is a parameter related to visibility of an image.

(13) The control method of an imaging apparatus according to (12), in which the visibility includes brightness or sharpness.

(14) The control method of an imaging apparatus according to (13), in which in a case of performing the first processing, the part is set to be brighter or sharpness of the part is set to be higher than in a case of performing the second processing.

(15) The control method of an imaging apparatus according to (13), in which in a case of performing the first processing, the part is set to be darker or sharpness of the part is set to be lower than in a case of performing the second processing.

(16) The control method of an imaging apparatus according to any one of (10) to (15), in which the movable range in a case of performing the first processing is decided based on a ratio of sizes of the first region and the second region.

(17) The control method of an imaging apparatus according to (16), in which in a case of correcting the image shake by moving both of the imaging element and the lens, the movable range of the imaging element is decided based on a first allocation ratio allocated to the imaging element in the ratio, and the movable range of the lens is decided based on a second allocation ratio allocated to the lens in the ratio.

(18) A control program of an imaging apparatus including an imaging element that images a subject through an imaging optical system, the control program causing a processor to execute a recording control of performing any of first processing of recording a first captured image output from a first region of a light-receiving region of the imaging element and second processing of recording a second captured image output from a second region, which is larger than the first region, of the light-receiving region, an image shake correction control of correcting an image shake of a captured image output from the imaging element by moving one or both of the imaging element and a lens included in the imaging optical system, image processing of generating a live view image for displaying a captured image output from the second region on a display unit, and a control of setting, in a case of performing the first processing, a movable range of at least one of the imaging element or the lens in the image shake correction control to be larger than in a case of performing the second processing.

While various embodiments are described above with reference to the drawings, the present invention is not limited to such examples. It is apparent that those skilled in the art may perceive various modification examples or correction examples within the scope disclosed in the claims, and those examples are also understood as falling within the technical scope of the present invention. In addition, any combination of each constituent in the embodiment may be used without departing from the gist of the invention.

The present application is based on Japanese Patent Application (JP2020-079514) filed on Apr. 28, 2020, the content of which is incorporated in the present application by reference.

EXPLANATION OF REFERENCES 1A, 1: digital camera
D1, D3: image signal
L1, L3a, L3: image
P1: crop recording image
11, 12: diagonal length
r1, r2: difference
C1, C2: circle
G1, G2: data
D2: captured image signal
P2: normal recording image
10: camera body
12: imaging element
13: imaging element shift mechanism
14: imaging element drive unit
15: display unit
16: memory
17: motion detection sensor
18: system control unit
19: recording medium
20A, 20: lens device
30A: image circle
30: imaging optical system
31: imaging lens
32: vibration-proof lens
33: vibration-proof lens drive mechanism
40: lens control unit
120A: center
120: light-receiving region
121: crop region
122: edge part region
150: display surface
200: smartphone
201: casing
202: display panel
203: operation panel
204: display and input unit
205: speaker
206: microphone
207: operation unit
208: camera unit
210: wireless communication unit
211: call unit
212: recording unit
213: external input-output unit
214: GPS reception unit
215: motion sensor unit
216: power supply unit
217: internal recording unit

218: external recording unit
220: main control unit

What is claimed is:

1. A processor of an imaging apparatus including an imaging element that images a subject through an imaging optical system, the processor being configured to:
 perform a recording control of performing one of: first processing of recording a first captured image output from a first region of a light-receiving region of the imaging element;
 and second processing of recording a second captured image output from a second region, which is larger than the first region, of the light-receiving region;
 perform an image shake correction control of correcting an image shake of a captured image output from the imaging element by moving one or both of the imaging element and a lens included in the imaging optical system; and
 perform a control of setting, in a case of performing the first processing, a movable range of at least one of the imaging element and the lens in the image shake correction control to be larger than in a case of performing the second processing,
 wherein the processor is configured to decide the movable range in a case of performing the first processing based on a ratio of sizes of the first region and the second region.

2. The processor of an imaging apparatus according to claim 1,
 wherein the processor is configured to, in a case of correcting the image shake by moving both of the imaging element and the lens, decide the movable range of the imaging element based on a first allocation ratio allocated to the imaging element and decide the movable range of the lens based on a second allocation ratio allocated to the lens, and
 the first allocation ratio and the second allocation ratio are decided based on the ratio of sizes of the first region and the second region.

3. An imaging apparatus comprising:
 the processor according to claim 1; and
 the imaging element.

4. A control method of an imaging apparatus including an imaging element that images a subject through an imaging optical system, the method comprising:
 performing a recording control of performing any of first processing of recording a first captured image output from a first region of a light-receiving region of the imaging element and second processing of recording a second captured image output from a second region, which is larger than the first region, of the light-receiving region;
 performing an image shake correction control of correcting an image shake of a captured image output from the imaging element by moving one or both of the imaging element and a lens included in the imaging optical system; and
 performing a control of setting, in a case of performing the first processing, a movable range of at least one of the imaging element and the lens in the image shake correction control to be larger than in a case of performing the second processing,
 wherein the movable range in a case of performing the first processing is decided based on a ratio of sizes of the first region and the second region.

5. The control method of an imaging apparatus according to claim 4,
 wherein in a case of correcting the image shake by moving both of the imaging element and the lens, the movable range of the imaging element is decided based on a first allocation ratio allocated to the imaging element, and the movable range of the lens is decided based on a second allocation ratio allocated to the lens, and
 the first allocation ratio and the second allocation ratio are decided based on the ratio of sizes of the first region and the second region.

6. A non-transitory computer readable medium storing a control program of an imaging apparatus including an imaging element that images a subject through an imaging optical system, the control program causing a processor to execute:
 a recording control of performing any of first processing of recording a first captured image output from a first region of a light-receiving region of the imaging element and second processing of recording a second captured image output from a second region, which is larger than the first region, of the light-receiving region;
 an image shake correction control of correcting an image shake of a captured image output from the imaging element by moving one or both of the imaging element and a lens included in the imaging optical system; and
 a control of setting, in a case of performing the first processing, a movable range of at least one of the imaging element and the lens in the image shake correction control to be larger than in a case of performing the second processing,
 wherein the movable range in a case of performing the first processing is decided based on a ratio of sizes of the first region and the second region.

* * * * *